(12) United States Patent
Chikhalikar et al.

(10) Patent No.: US 10,081,720 B2
(45) Date of Patent: Sep. 25, 2018

(54) MODIFIED POLYPROPYLENE COMPOSITIONS FOR REDUCED NECKING IN EXTRUSION FILM CASTING OR EXTRUSION COATING PROCESSES

(71) Applicant: Council of Scientific & Industrial Research, New Delhi (IN)

(72) Inventors: Kalyani Suresh Chikhalikar, Pune (IN); Ashish Kishore Lele, Pune (IN); Harshawardhan Vinayak Pol, Pune (IN); Kishor Shankar Jadhav, Chembur (IN); Sunil Janardan Mahajan, Chembur (IN); Zubair Ahmad, Chembur (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 14/370,830

(22) PCT Filed: Jan. 7, 2013

(86) PCT No.: PCT/IN2013/000012
§ 371 (c)(1),
(2) Date: Jul. 7, 2014

(87) PCT Pub. No.: WO2013/102938
PCT Pub. Date: Jul. 11, 2013

(65) Prior Publication Data
US 2015/0018463 A1 Jan. 15, 2015

(30) Foreign Application Priority Data
Jan. 7, 2012 (IN) .............................. 3532/DEL/2011

(51) Int. Cl.
*C08K 5/5393* (2006.01)
*C08K 5/00* (2006.01)
*C08K 5/098* (2006.01)
*C08K 5/14* (2006.01)
*C08K 5/105* (2006.01)
*C08F 8/00* (2006.01)
*C08K 3/22* (2006.01)
*C08K 3/26* (2006.01)

(52) U.S. Cl.
CPC .............. *C08K 5/5393* (2013.01); *C08F 8/00* (2013.01); *C08K 5/005* (2013.01); *C08K 5/098* (2013.01); *C08K 5/105* (2013.01); *C08K 5/14* (2013.01); *C08F 2810/10* (2013.01); *C08K 3/22* (2013.01); *C08K 3/26* (2013.01)

(58) Field of Classification Search
CPC .. C08J 3/20; C08L 23/10; C08L 23/12; C08L 23/14; C08K 5/14
See application file for complete search history.

(56) References Cited

U.S. PATENT DOCUMENTS

| 6,323,289 B1 * | 11/2001 | Hogt ..................... C08K 5/14 525/387 |
| 2004/0158010 A1 * | 8/2004 | Lehmus ............... C08F 210/06 526/127 |
| 2010/0234547 A1 * | 9/2010 | Kolb ...................... C07F 7/006 526/172 |

FOREIGN PATENT DOCUMENTS

| KR | 100737296 B1 * | 7/2007 | |
| KR | 2011002205 A * | 1/2011 | ............ C08L 23/10 |
| WO | WO 9927007 A1 * | 6/1999 | ............ C08K 5/14 |
| WO | WO02/090399 | 11/2002 | |
| WO | WO2011/086581 | 7/2011 | |
| WO | WO 2011086581 A1 * | 7/2011 | ............... C08F 8/00 |
| WO | WO2012/049690 | 4/2012 | |

OTHER PUBLICATIONS

INEOS (Typicaly Engineering Properties of Polypropylene. INEOS Olefins and Polymers USA. Apr. 2014. 2 pages).*
English machine translation of KR 2011002205 (Jan. 2011, 9 pages).*
Karger-Kocsis (Polypropylene Structure, blends and composites: vol. 2 Copolymers and Blends. Chapter 1: Manufacturing and properties of polypropylene copolymers; 1.6 Heterophasic Copolymers: Structure and Properties. Springer Science+Business Media Dordrecht, 1995, pp. 1-24, specifically, pp. 14-15.*
Machine translated English equivalent of KR 10-0737296 (Jul. 2007, 8 pages).*
International Search Report and the Written Opinion of the International Searching Authority, Council of Scientific & Industrial Research, PCT/IN2013/000012, dated Apr. 23, 2013.

* cited by examiner

*Primary Examiner* — Brieann R Johnston
(74) *Attorney, Agent, or Firm* — Dinsmore & Shohl LLP

(57) ABSTRACT

The present invention discloses a modified polypropylene composition with higher flow activation energy and reduced necking in extrusion film/coat, wherein the composition comprises long chain branched polypropylene; a free radical initiator; a primary antioxidant; a secondary antioxidant; an acid neutralizer; and optionally a multifunctional monomer. Further the said composition of polypropylene shows higher sensitivity of viscosity to temperature, with improved stretchability.

12 Claims, 5 Drawing Sheets

MODIFIED POLYPROPYLENE COMPOSITIONS FOR REDUCED NECKING IN EXTRUSION FILM CASTING OR EXTRUSION COATING PROCESSES

TECHNICAL FIELD OF INVENTION

The present invention relates to a composition of polyolefin for reducing the extent of film/coating necking of polypropylene in extrusion processes.

Particularly, the present invention provides polypropylene (PP) compositions modified with long chain branched polypropylene (LCB-PP) to reduce necking in extrusion film casting or extrusion coating processes.

Further the said composition of polypropylene shows higher flow activation energy, and sensitivity of viscosity to temperature, and good stretchability.

BACKGROUND AND PRIOR ART

Polypropylene (PP) films are coated on raffia fabric in industrial extrusion film casting/coating processes. Casting of film is also the first step in a BOPP process. PP, a linear polymer, exhibits shear thinning and extensional thinning properties. Consequently, PP displays significant reduction in the width of the final film/coating in an extrusion film casting or coating process. This is called the 'necking' defect. As a result, the processor is left with a film/coating having significantly reduced width as compared to the original die width. Necking also causes the film to thicken at the edges, which is called 'edge-beading'. In industrial casting processes film edges are typically trimmed, which further reduces the usable width of the film. Moreover, the uneven thickness leads to differential shrinkage resulting in delamination.

The problem/need is to reduce the extent of necking and the consequent edge-beading of extruded film/coating for polypropylene.

In industry, processors run cast film/coating lines at reduced speed to reduce the necking and edge-beading extent. Also, a small amount (typically, 10-20%) of low-density polyethylene (LDPE) is often used as an additive in the base PP polymer to reduce necking. However, the blend of PP and LDPE is an inhomogeneous blend and may lead to other disadvantages such as reduced strength, increased haze and other such similar problems.

US Patent US2010/0087602 to Li et al. discloses a method comprising contacting a polypropylene, an acrylate-containing compound, and an initiator to form a composition, and reactively extruding the composition to form a polymer formulation. This reactive extruded composition is formed into a film where the composition has a melt flow rate that is reduced by equal to or greater than 5% when compared to neat polypropylene and a pressure drop that is lower than that for the neat polypropylene.

US 2012/20730 discloses the high melt strength polypropylene (HMS-PP) functionalized maleated polypropylene. The nanolayer enhancement of biaxially oriented polypropylene film for increased gas barrier is disclosed in Polymer 51 (24), 2010, 5807-5814 by Yijian Lin et al. Further CN101381491 relates to a method for preparing a polypropylene compound with high beta crystal content, comprising of polypropylene resin, an antioxidant and an amide nucleating agent.

While compositions with PP and multi functional acrylate monomers are disclosed in prior arts and possess several properties of industrial application, it is also well known that such combinations cause formation of undesirable side products, such as homo polymers of acrylates. Such side products are known to reduce the purity of the desired polymer product.

In view of above prior arts, the constraint regarding the necking and subsequent edge-beading is not addressed, which is an important industrial problem, affecting the quality of film produced in the casting process.

Further, it may be desirable to have a polymeric composition that is devoid of acrylates and related compounds and polymers such that the PP polymer is presented in a pure form, possibly enhancing its industrial applicability.

Therefore there exists a need in prior art to seek a solution to resolve the problems associated with the extrusion film casting or coating processes.

While prior art processes and compositions have tried this, they usually include acrylates as one of the ingredients, which can lead to formation of unnecessary, undesired related compounds, which affect the purity and therefore performance of the polymer.

OBJECTS OF THE INVENTION

The object of this invention is to provide a composition of polypropylene that exhibits significantly reduced necking tendency and higher flow activation energy.

Another object of the invention is to provide a composition of polypropylene devoid of acrylates that exhibits significantly reduced necking tendency and higher flow activation energy.

ABBREVIATIONS

BOPP: Biaxially oriented polypropylene LDPE: Low-density polyethylene LCB-PP: Long chain branched polypropylene MFR/MFI: Melt flow rate or index SSE: Single screw extruder ppm: parts per million

SUMMARY OF THE INVENTION

Accordingly the present invention provides a modified polypropylene composition comprising long chain branch of polypropylene; free radical initiator; primary antioxidant; secondary anti-oxidant; acid neutralizer, characterized in that the flow activation energy of the composition is in the range of 40-60 kJ/mole.

In an embodiment of the invention wherein the polypropylene is impact copolymer (ICP), having a density range from 0.9 to 0.95 g/cm3 and the melt flow rate or index of impact copolymer (ICP), is in the range from 0.5 to 2.5 g/10 min.

In another embodiment of the invention wherein free radical initiator may be selected from the group consisting of peroxidicarbonates of formula R'—OCOOCO—R, wherein R and R' are identical or different and independently selected from branched or linear (C1-C5) alkyl, (C6-C12) alicyclic, cetyl, [3-(isobutyryloxy)-2,2,4-trimethylpentyl]; in the range of 2000-8000 ppm by wt. preferably 4000-6000 ppm by wt.

In yet another embodiment of the invention wherein the half-life of peroxidicarbonates is in the range of 0.1-1 min at the extrusion temperature of polypropylene.

In still another embodiment of the invention, wherein said primary antioxidant is hindered phenolic-type antioxidants selected from the group pentaerythritol tetrakis(3-(3,5-di-tert-butyl-4-hydroxyphenyl)propionate), including IRGANOX 1010 FF; IRGANOX 1010 DD; 1,3,5-tris(3,5- di-tert-butyl-4-hydroxybenzyl)-1,3,5-triazine-2,4,6(1H,3H, 5H) trione and 1,3,5Trimethyl2,4,6tris(3,5di-tert-butyl-4 hydroxybenzyl)benzene 330 in the range of 200-800 ppm by weight, preferably 400 to 800 ppm.

In a further embodiment of the invention wherein the secondary oxidant may be organo phosphites or organo phosphonite, selected from tris(2,4-di-tert-butylphenyl) phosphate,bis (2,4-di-t-burylphenyl) pentaerythritol diphosphite, including ULTRANOX 627A, 2,4,6tri-t-butylphenyl-2-butyl-2-ethyl-1,3-propanediolphosphite,Bis(2,4-dicumylphenyl) pentaerythritol diphosphite, tris[2-[[2,4,8,10-tetra-tert-butyldibenzo[d,f][1,3,2]dioxaphosphepin-6-yl]oxy] ethyl]amine, [4-[4-bis(2,4-ditert-butylphenoxy) phosphanylphenyl]phenyl]-bis(2,4-ditert-butylphenoxy) phosphane in the range of 400-1400 ppm by weight, preferably 500 to 1200 ppm by wt.

One more embodiment of the invention wherein an acid neutralizer is metal salt, wherein the metal is selected from the group consisting of alkali, an alkaline-earth or transition-metal, preferably the metal is selected from Na, K, Ca, Zn, Al and like thereof, while the metal salt can be carbonate, stearate, hydroxide, acetate, oxide, alkoxide or combination thereof in the range of 200-1000 ppm by wt., preferably 300-900 ppm by wt.

One more embodiment of the invention wherein necking is reduced up to 50%. Still another embodiment of the invention wherein the increase in die swell is in the range of 50-100%.

The present invention provides a composition of polypropylene (PP) with long chain branched polypropylene (LCB-PP) to reduce necking and edge-beading defect, wherein the modified polypropylene composition comprises a) a long chain branched polypropylene b) a free radical initiator; c) a primary antioxidant; d) a secondary antioxidant; and e) an acid neutralizer.

In another aspect the instant modified polypropylene composition shows higher flow activation energy, greater sensitivity of viscosity to temperature and improved strechabillity.

DETAILED DESCRIPTION OF INVENTION

Figure 4:
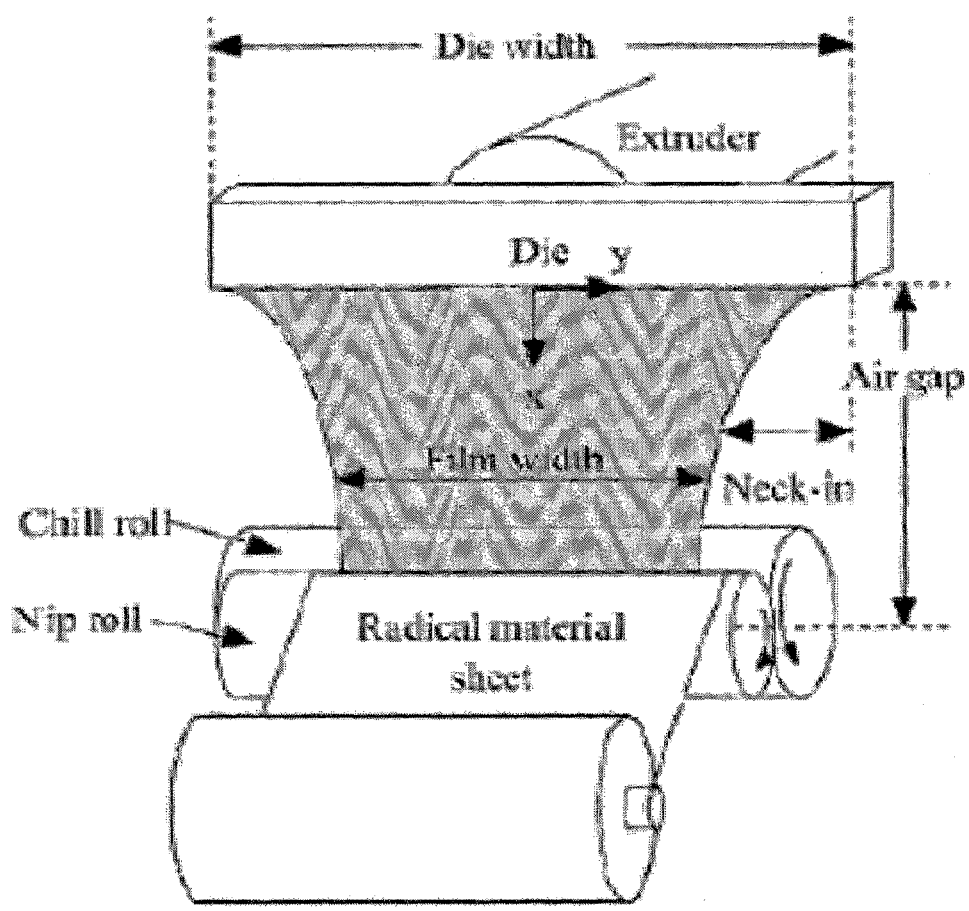
FIG. 4 depicts schematic for extrusion film casting.

The invention will now be described in detail in connection with certain preferred and optional embodiments, so that various aspects thereof may be more fully understood and appreciated. With reference to FIG. 4, the reduction in width of film after coming out of the die is necking, and the thickness at the edges of the film in comparison to the thickness of the film across its width is more and is called edge beading.

The present invention provides a composition of polypropylene (PP) with long chain branched polypropylene (LCB-PP) to reduce necking and edge-beading defect, wherein the modified polypropylene composition comprises a) a long chain branched polypropylene b) a free radical initiator; c) a primary antioxidant; d) a secondary antioxidant; and e) an acid neutralizer. In another aspect the instant modified polypropylene composition shows higher flow activation energy, greater sensitivity of viscosity to temperature and improved stretchability.

In preferred embodiment, the present invention provides a composition of polypropylene (PP) with long chain branched polypropylene (LCB-PP) to reduce necking and edge-beading defect, wherein the modified polypropylene composition comprises of a) a long chain branched polypropylene b) a free radical initiator; c) a primary antioxidant; d) a secondary antioxidant; and e) an acid neutralizer.

Accordingly, the polypropylene can be a homopolymer, a random copolymer, an impact copolymer, a blend or mixture of any of these, or a blend of a modified homopolymer with a second phase, i.e., 1.5 Melt flow index polypropylene (MFI PP) Impact copolymer.

The polypropylene can be isotactic or syndiotactic, with a melt flow index or rate (MFI) of from 0.1 to 5 g/10 min, preferably 0.5 to 2.5 g/10 min.

Melt Flow Index is the output rate (flow) of the mass of polymer in grammes that occurs in 10 minutes through a standard die, which is measured according to ASTM D 1238 standard at 230° C. under a load of 2.16 kg.

Particularly, the polypropylene used in the instant composition is impact copolymer (ICP), wherein the ICP having a density range from 0.9-0.95 g/cm$^3$, The ICP may have a melting point of 230° C. and a melt flow rate or index (MFR) ranging from 1 to 2 g/10 min.

In a preferred embodiment of the invention, the composition of PP is Modified copolymer A (Modified PP-A composition), which comprises;

1. a long chain branched polypropylene 2. a free radical initiator: 3. a primary antioxidant: 4. a secondary antioxidant: 5. an acid neutralizer:

In case of Modified copolymer A composition, the free radical initiator is selected from the compounds of peroxidicarbonates family of general formula R'—OCOOCO—R, and having half-life in the range 0.1-1 min at the extrusion temperature of PP.

According to the invention the free radical initiator is selected from the group of peroxidicarbonates.

The peroxidicarbonates having general formula R'—OCOOCO—R; wherein R and R' are free radicals which may be identical or different and independently selected from branched or linear (C1-C5) alkyl, (C6-C12) alicyclic, cetyl, [3-(isobutyryloxy)-2,2,4-trimethylpentyl];

According to the invention, the initiator consisting of peroxydicarbonates group may be present in a reaction mixture in an amount ranging from 3000 ppm to 6000 ppm by wt., particularly 4000-6000 ppm by wt., based on the total weight of the final PP composition; whereas initiator consisting of dialkyl peroxide group may be present in a reaction mixture in an amount ranging from 100 to 2000 ppm by wt., particularly 100-1000 ppm, based on the total weight of the final PP composition.

The modification of neat Polypropylene is done in a reactive extrusion process in a single or twin screw extruder having residence time in the range of the half-life of the initiator. The instant PP composition may display a reduced melt pressure due to the presence of long chain branching, which results in a higher extrusion rate when compared to neat polypropylene with similar melt flow rate.

The primary antioxidants involved in the invention may include hindered phenolic-type antioxidants selected from the group pentaerythritol tetrakis(3-(3,5-di-tert-butyl-4-hydroxyphenyl)propionate), including IRGANOX 1010 FF; IRGANOX 1010 DD; 1,3,5-tris(3,5-di-tert-butyl-4-hydroxybenzyl)-1,3,5-triazine-2,4,6(1H,3H,-5H)-trione. and 1,3,5Trimethyl2,4,6tris(3,5di-tert-butyl-4hydroxybenzyl) benzene 330. Such antioxidant provides long-term thermal stability to the instant PP composition. While higher amounts of these primary antioxidants may be used, whereas the quantity is in the range of 200 to 800 ppm by weight, preferably 400 to 800 ppm.

The secondary antioxidants may include organo phosphites or organo phosphonite, such as tris(2,4-di-tert-butylphenyl)phosphate,bis(2,4-di-t-butylphenyl) pentaerythritol diphosphite, including ULTRANOX 627A, 2,4,6tri-t-butylphenyl-2-butyl-2-ethyl-1,3-propanediolphosphite,Bis(2,4-dicumylphenyl) pentaerythritol diphosphite, tris[2-[[2,4,8,10-tetra-tert-butyldibenzo[d,f][1,3,2]dioxaphosphepin-6-yl]oxy]ethyl]amine,[4-[4-bis(2,4-ditert butylphenoxy) phosphanylphenyl]phenyl]-bis(2,4-ditert-butylphenoxy) phosphane. Optionally secondary antioxidants comprises the benzofuranone (lactone) derivatives or thioesters of fatty acids, wherein these secondary antioxidants function as processing stabilizers by providing stability in melt flow and color during the melt processing of the polymer material also it enhance the heat aging stability of primary antioxidants. The amount of secondary antioxidants is comparatively higher than primary anti-oxidant, wherein the quantity is in the range of 400-1400 ppm by weight, preferably 500 to 1200 ppm by wt.

Acid neutralizers used for the present invention can be metal salts, wherein metal is selected from the group consisting of alkali, an alkaline-earth or transition-metal particularly the metal is selected from Na, K, Ca, Zn, Al and like thereof, while the metal salt can be carbonate, stearate, hydroxide, acetate, oxide, alkoxide or combination thereof.

The acid neutralizers used in the present composition may be in the range of 200-1000 ppm by wt., particularly 300-900 ppm by wt.

In another embodiment, the invention provides method of making modified-PP which includes reactively blending of long chain branched polypropylene, with free radical initiator, primary anti-oxidant, secondary antioxidant and acid neutralizer, in a twin extruder with length to diameter ratio L/D of the screws in the range of 22-25 to obtain the modified polypropylene product with reduced necking.

In another embodiment of the invention, the PP composition of the invention provides extensional strain-hardening ability to the base PP which leads to enhancement of the ability of PP to withstand the planar extensional stresses during extrusion film casting.

In another embodiment of the invention, the PP composition of the invention provides long relaxation times which contributes to higher resistance to stretching and thereby increases the ability of PP to withstand the planar extensional stresses during extrusion film casting.

In yet another embodiment of the invention, the PP composition shows higher flow activation energy (Table 2) which leads to greater sensitivity of viscosity to temperature, accordingly improves the stretchability during cooling of the film in a casting process.

The flow activation energy of modified PP-composition is in the range of 40-60 (kJ/mole)

In an embodiment of the invention, LCB-PP is a shear thinning material (FIG. 1), which significantly attributes advantage in melt processing in an extruder.

Figure 5:
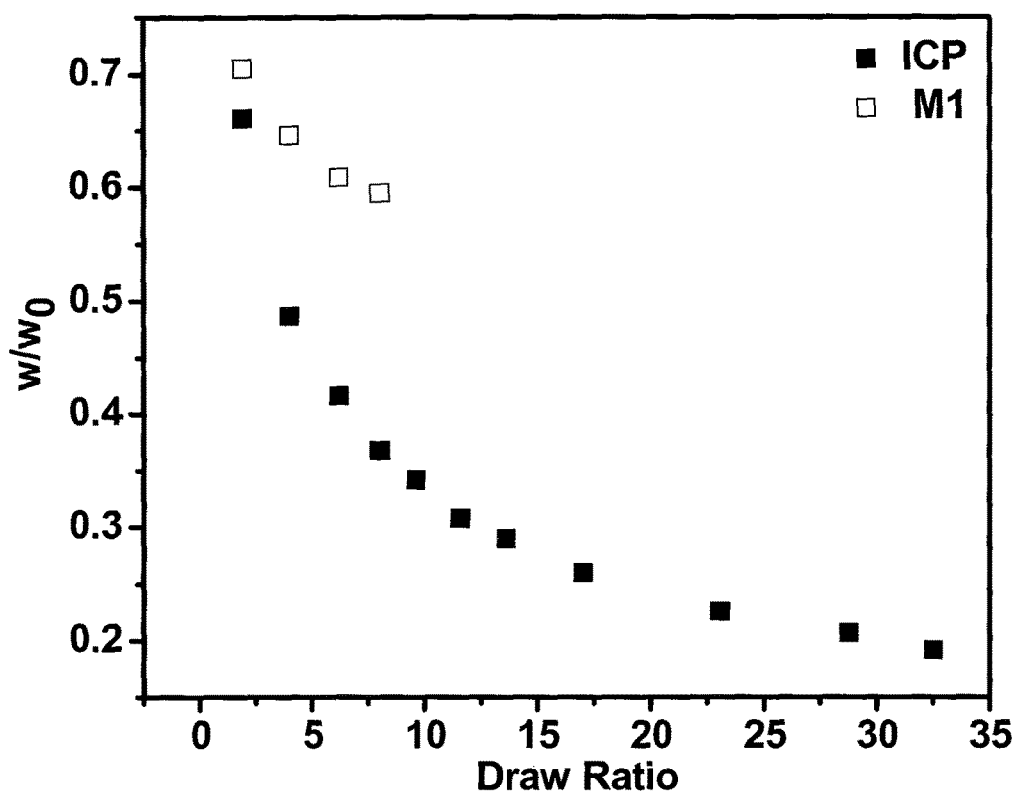
FIG. 5 depicts normalized width of film (ratio of width of the film after it comes out of the die to width of the die) as a function of the draw ratio (defined as tangential velocity of chill roll to exit velocity at film die) to study neck-in tendency of unmodified impact PP(ICP) and M1(A) materials in extrusion film casting. The figure shows the reduced necking of the modified polymer composition(A) as against the unmodified impact co polymer(ICP).

Higher activation energy, zero shear viscosity, longer relaxation time, more shear-thinning and increased elasticity in shear rheology results are strong indications of the presence of long chain branching in modified copolymers. Strain hardening in extensional viscosity for modified copolymers is also strong indication of presence of branching; same is poor in base copolymer. The composition of polypropylene (PP) modified with long chain branches of PP (LCB-PP) reduce the necking up to 50% (FIG. 5).

Figure 1:
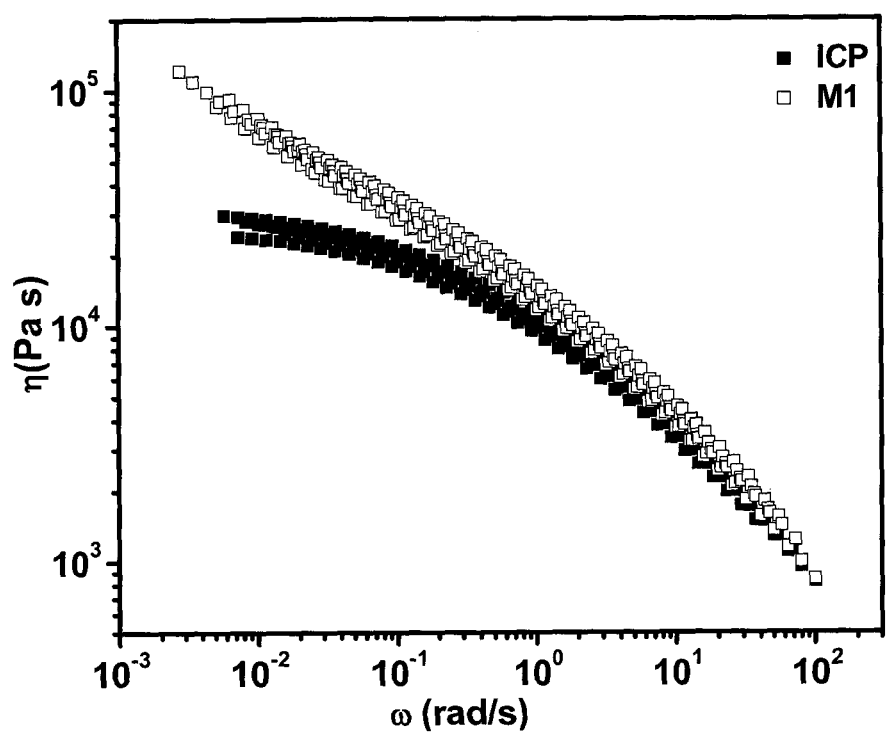
FIG. 1 is a plot of complex viscosity. M1 shows higher complex viscosity and shear thinning against unmodified impact copolymer.
Figure 2:
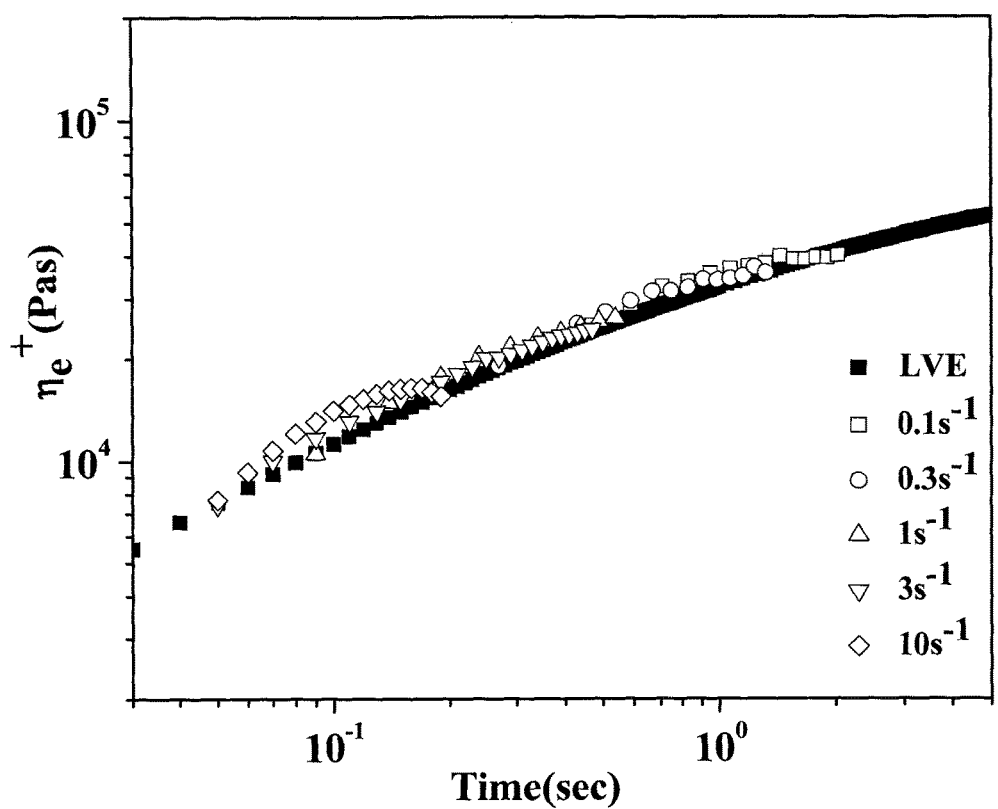
FIG. 2: Extensional viscosity plot for ICP base copolymer at different strain rates. ICP is a linear copolymer and hence does not show strain hardening.
Figure 3:
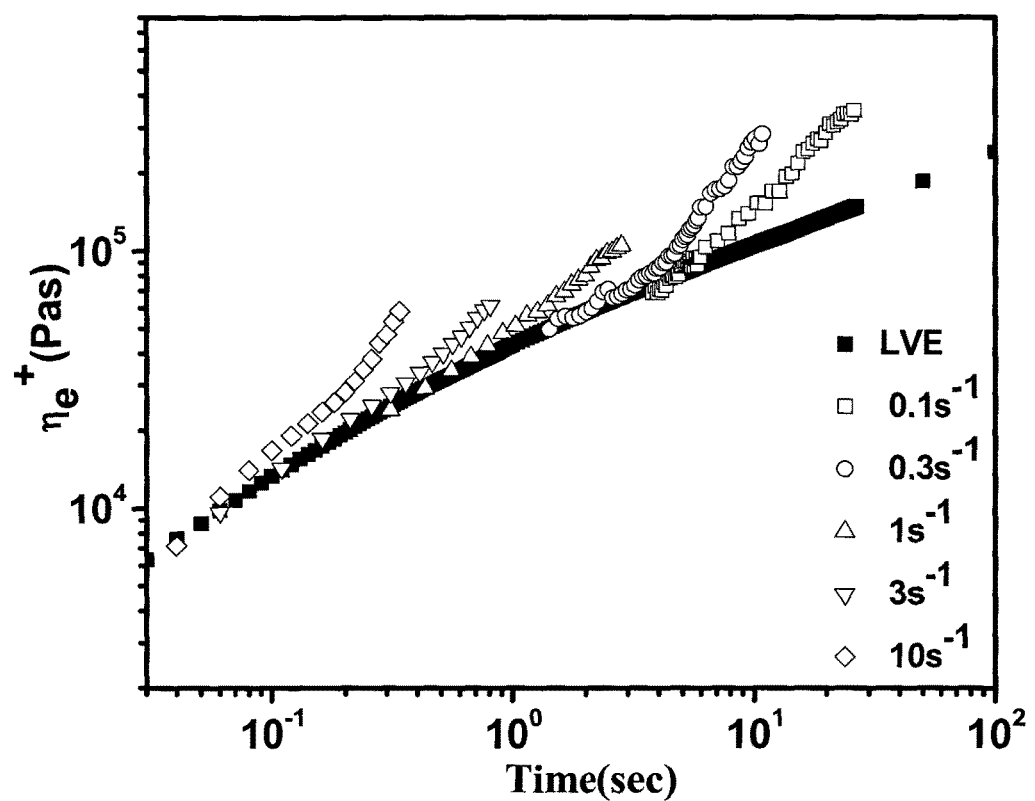
FIG. 3: Extensional viscosity plot for M1 modified copolymer at different strain rates. M1 show strain hardening which is an indication of presence of long chain branching inside modified copolymer.

It is observed that peroxide modified copolymer (modified PP-A) shows considerably decreased neck-in tendency in an extrusion film casting process, because peroxide modified composition shows higher zero shear viscosity, greater shear-thinning and larger elongational strain-hardening in rheology results and base copolymer shows poor strain hardening (FIGS. 1, 2 and 3).

Additionally, the modified polypropylene film made by the instant composition is transparent or translucent and retains stretchability.

In yet another embodiment of the invention, the modified compositions were studied for increase in die swell. Die swell is measured as the ratio of extrudate diameter to die diameter.

As polymer melt leaves the die, it expands due to relaxation of stresses at the die exit and extrudate diameter increases as compared to die diameter. The modified compositions indicating presence of long chain branching and in turn increase in elasticity, swell more as compared to unmodified composition. This is measured in same capillary rheometer in which MFI is measured. Extrudate diameter is measured and ratio of extrudate diameter to die diameter is taken and percentage is calculated. For modified compositions increase in die swell is desired in the range of 50-100%. This is evident from die swell result as enlisted in table 2. The increase in die swell for the modified compositions of the invention is in the range of 50-100%.

In an embodiment, an article can be obtained by subjecting the modified-PP composition to a extrusion film coating or casting process, alternatively foaming, sheet extrusion thermoforming,
extrusion blow moulding, blow moulding, injection blow moulding, injection stretch blow moulding, thermoforming and like thereof.

The modified polypropylene composition may be useful in food packaging, office supplies, structural supports, laminate compositions, polymeric foam substrate, decorative surfaces, outdoor furniture, point-of-purchase signs and displays, house wares and consumer goods, building insulation, cosmetics packaging, outdoor replacement materials, lids and food/beverage containers, appliances, utensils, electronic components, automotive parts, enclosures, medical supplies, glass and metal containers, toys, piping, also applicable in magazine covers, clothes packaging, agriculture packaging, construction packaging, bags and pouches, gift wraps and baskets, lamination/protective films, floristry packing consumer products, including diaper backing, garment bags, household wrap and trash bags, materials handling, including stretch wrap and shrink wrap and like thereof.

Additionally, the advantages gained with polyolefin films, particularly polypropylene films are ease of processing, light weight, good toughness and tear resistance, flexibility, chemical resistance and relatively low cost compared with other plastics.

The basic properties of polypropylene can be modified with a broad range of chemical modifiers. Further, polypropylene-based films can be co-extruded with various other polymers, including ethylene vinyl alcohol (EVOH), Ionomer, linear low-density polyethylene (LLDPE), high-density polyethylene (HDPE) nylon, polyamide/ethylene-vinyl acetate (PA/EVA), polyester barrier resins and adhesive tie layers to produce multilayer films with special, high-performance properties for large scale applications.

EXPERIMENTS

Extrusion Film Casting Experiments

Extrusion film casting experiments were performed on a 19 mmD single screw extruder (SSE) (Thermo Haake Polylab System) equipped with a film die of 100 mm width×0.45 mm lip thickness and chill roll attachment. Extrusion was done at 20 rpm screw speed, chill roll speeds of 50 to 850 rpm and at take up length of 228 mm. Temperature profile of extruder is shown in table below:

The single screw extrusion temperature at 20 rpm screw speed is in the range of 150° C.-200° C.

|  | E1 | E2 | E3 | $T_{die}$ |
|---|---|---|---|---|
| SSE Temp (° C.) | 170 | 180 | 190 | 190 |

Chill roll RPM—50, 100, 150, 200, 250, 300, 350, 450, 600, 750, 850.

The following examples, which include preferred embodiments, will serve to illustrate the practice of this invention, it being understood that the particulars shown are by way of examples and for purpose of illustrative discussion of preferred embodiments of the invention only and are not limiting the scope of the invention.

EXAMPLE

Example 1

Synthesis of Modified PP-A

The 1.5 MFI PP impact copolymer was mixed with 5000 ppm by wt. of dicetyl peroxydicarbonate and primary antioxidant Irgonox 1010 in the quantity of 500 ppm by wt. and secondary antioxidant PEPQ with 600 ppm by wt. Further the composition was blended with 600 ppm by wt. of calcium stearate, to obtain modified PP-A.

Example 2

TABLE 1

Composition details:

| S. No. | Sample | Polymer | Additive package | Modifier |
|---|---|---|---|---|
| 1 | C015EG (Unmodified copolymer) (ICP) | 1.5 MFI PP Impact copolymer (1 kg) | Prim. AO - Irganox 1010 = 500 ppm Sec. AO - PEPQ = 600 ppm Acid Neutralizer-Calcium Stearate = 600 ppm, | None |
| 2 | M1 (Modified copolymer A) Twin screw extruder L/D on which M1 was modified is 25 (625/25) . . . | 1.5 MFI PP Impact copolymer (1 kg) | Prim. AO - Irganox 1010 = 500 ppm Sec. AO-PEPQ = 600 ppm Acid Neutralizer-Calcium Stearate = 600 ppm, | Peroxide (Dicetyl peroxydicarbonate) = 5000 ppm |
| 3 | C008EG Lot# H1210414(B) Twin screw extruder L/D on which 414 was modified-22 (6600/300) | 1.5 MFI PP Impact copolymer (1 kg) | Prim. AO - Irganox 1010 = 500 ppm Sec. AO-PEPQ = 600 ppm Acid Neutralizer-Calcium Stearate = 600 ppm | Peroxide (Dicetyl peroxydicarbonate) = ~5000 ppm |
| 4 | C008EG Lot# H1111166 (C) | 1.5 MFI PP Impact copolymer (1 kg) | Prim. AO - Irganox 1010 = 500 ppm Sec. AO-PEPQ = 600 ppm Acid Neutralizer-Calcium Stearate = 600 ppm, | Peroxide (Dicetyl peroxydicarbonate) = ~2200 ppm |
| 5 | PO 1 (D) | 1.5 MFI PP Impact copolymer (1 kg) | Prim. AO - Irganox 1010 = 500 ppm, Sec. AO-PEPQ = 600 ppm Acid neutralizer-Calcium Stearate = 600 ppm | Peroxide (Dicetyl peroxydicarbonate) = 3000 ppm |
| 6 | PO 2 (E) | 1.5 MFI PP Impact copolymer (1 kg) | Prim. AO-Irganox 1010 = 500 ppm Sec. AO-PEPQ = 600 ppm Acid neutralizer- | Peroxide (Dicetyl peroxydicarbonate) = 4000 ppm |

TABLE 1-continued

Composition details:

| S. No. | Sample | Polymer | Additive package | Modifier |
|---|---|---|---|---|
| 7 | PO 3 (F) | 1.5 MFI PP Impact copolymer (1 kg) | Calcium Stearate = 600 ppm<br>Prim. AO - Irganox 1010 = 500 ppm<br>Sec. AO-PEPQ = 600 ppm<br>Acid neutralizer-Calcium Stearate = 600 ppm | Peroxide (Dicetyl peroxydicarbonate) = 5000 ppm |

Primary Antioxidant—Irganox 1010=Pentaerythritol Tetrakis(3-(3,5-di-tert-butyl-4 hydroxyphenyl)propionate)
Secondary Antioxidant PEPQ=Tetrakis(2,4-di-tert-butylphenyl)[1,1-biphenyl]-4,4'diylbisphosphonite

TABLE 2

| Sample | Activation Energy (kJ/mole) | Melt strength (N) | MFI (g/10 min) | Die Swell (%) |
|---|---|---|---|---|
| C015EG | 37 | 0.04 | 1.6 | 9 |
| M1(A) | 48 | 0.08 | 0.84 | 52 |
| C008EG66(C) | 61 | | 0.79 | 65 |
| 414(B) | 61 | | 0.44 | 74 |
| PO1(D) | 41 | | 0.88 | 51 |
| PO2(E) | 37 | | 0.8 | 53 |

We claim:

1. A composition for extrusion comprising:
an impact copolymer (ICP), having a density range from 0.9 to 0.95 g/cm$^3$ and melt flow rate or index of the impact copolymer (ICP) in the range from 0.5 to 2.5 g/10 min, and including a long chain branched polypropylene homopolymer (LCB-PP);
a peroxidicarbonate free radical initiator in the range of 2000-8000 ppm by weight having a formula R'—OCOOCO—R, where R and R' are identical or different and independently selected from branched or linear (C1-C5)alkyl, (C6-C12) alicyclic, cetyl, and [3-(isobutyryloxy)-2,2,4-trimethylpentyl];
a primary antioxidant in the range of 200 to 800 ppm by weight;
a secondary anti-oxidant;
an acid neutralizer; and
wherein the composition is devoid of acrylate and has a flow activation energy in the range of 40-60 kJ/mole during extrusion.

2. The composition according to claim 1, wherein the peroxidicarbonate has a half life in the range of 0.1-1 min at the extrusion temperature of polypropylene.

3. The composition according to claim 1, wherein said primary antioxidant is a hindered phenolic-type antioxidant selected from the group consisting of pentaerythritol tetrakis (3-(3,5-di-tert-butyl-4-hydroxy-phenyl)propionate); 1,3,5-tris(3,5-di-tert-butyl-4-hydroxybenzyl)-1,3,5-triazine-2,4,6 (1H,3H,5H)trione and 1,3,5-trimethyl-2,4,6-tris(3,5-di-tert-butyl-4-hydroxybenzyl)benzene.

4. The composition according to claim 1, wherein the secondary anti-oxidant is an organo phosphite or organo phosphonite, selected from the group consisting of tris(2,4-di-tert-butylphenyl) phosphate, bis(2,4-di-t-butylphenyl) pentaerythritol diphosphate, 2,4,6tri-t-butylphenyl-2-butyl-2-ethyl-1,3-propanediolphosphite, bis(2,4-dicumylphenyl) pentaerythritol diphosphite, tris[2-[[2,4,8,10-tetra-tert-butyldibenzo [d,f] [1,3,2] dioxaphosphepin-6-yl] oxy] ethyl] amine, and [4-[4-bis(2,4-ditert-butylphenoxy) phosphanylphenyl]phenyl]-bis(2,4-ditert-butylphenoxy)phosphane in the range of 400-1400 ppm by weight.

5. The composition according to claim 1 wherein the acid neutralizer is a metal salt, wherein the metal is selected from the group consisting of an alkali, an alkaline-earth and transition-metal, while the metal salt is selected from the group consisting of carbonate, stearate, hydroxide, acetate, oxide, alkoxide and a combination thereof in the range of 200-1000 ppm by wt.

6. The composition according to claim 1, wherein necking during extrusion of the composition is reduced up to 50%.

7. The composition according to claim 1, wherein the increase in die swell during extrusion of the composition is in the range of 50-100%.

8. The composition according to claim 1, wherein the amount of the free radical initiator is in the range of 4000-6000 ppm by weight.

9. The composition according to claim 3, wherein the amount of said primary antioxidant is in the range of 400 to 800 ppm by weight.

10. The composition according to claim 4, wherein the amount of the secondary anti-oxidant is in the range of 500 to 1200 ppm by weight.

11. The composition according claim 5 wherein the amount of the metal salt is in the range of 300-900 ppm by wt.

12. The composition according to claim 5 wherein the metal of the metal salt is selected from the group consisting of Na, K, Ca, Zn, and Al.

* * * * *